United States Patent
Baldovino et al.

(10) Patent No.: US 11,485,327 B2
(45) Date of Patent: Nov. 1, 2022

(54) SENSOR APPARATUS WITH CLEANING

(71) Applicant: Ford Global Technologies, LLC, Dearborn, MI (US)

(72) Inventors: Segundo Baldovino, Novi, MI (US); Venkatesh Krishnan, Canton, MI (US); Sunil Reddy Patil, Troy, MI (US); Raghuraman Surineedi, Dearborn, MI (US); Rashaun Phinisee, Ypsilanti, MI (US); Ashwin Arunmozhi, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 409 days.

(21) Appl. No.: 16/855,673

(22) Filed: Apr. 22, 2020

(65) Prior Publication Data

US 2021/0331651 A1    Oct. 28, 2021

(51) Int. Cl.
| | |
|---|---|
| *B60S 1/56* | (2006.01) |
| *B60S 1/54* | (2006.01) |
| *B08B 5/02* | (2006.01) |
| *B05B 1/00* | (2006.01) |
| *B05B 7/08* | (2006.01) |

(52) U.S. Cl.
CPC ............... *B60S 1/56* (2013.01); *B05B 1/005* (2013.01); *B05B 7/08* (2013.01); *B05B 7/0838* (2013.01); *B08B 5/02* (2013.01); *B60S 1/54* (2013.01)

(58) Field of Classification Search
CPC ...... B60S 1/56; B60S 1/54; B60S 1/52; B05B 1/005; B05B 7/08; B05B 7/0838; B08B 5/02

USPC ................................................... 239/284.1
See application file for complete search history.

(56) References Cited

U.S. PATENT DOCUMENTS

| | | | |
|---|---|---|---|
| 2018/0015907 A1* | 1/2018 | Rice | B60S 1/56 |
| 2018/0015908 A1* | 1/2018 | Rice | B60S 1/56 |
| 2019/0277949 A1 | 9/2019 | Krishnan et al. | |
| 2019/0322245 A1 | 10/2019 | Kline et al. | |
| 2021/0146406 A1* | 5/2021 | Sykula | B08B 3/024 |
| 2022/0041139 A1* | 2/2022 | Surineedi | G01S 7/4813 |
| 2022/0057509 A1* | 2/2022 | Sykula | G01S 17/931 |
| 2022/0066031 A1* | 3/2022 | Robertson, Jr. | G01S 7/4814 |
| 2022/0089129 A1* | 3/2022 | Krishnan | B60R 11/04 |

(Continued)

FOREIGN PATENT DOCUMENTS

WO    2016025930 A1    2/2016

*Primary Examiner* — Christopher S Kim
(74) *Attorney, Agent, or Firm* — Frank A. MacKenzie; Bejin Bieneman PLC

(57) ABSTRACT

A sensor apparatus includes a sensor window; a first nozzle adjacent to the sensor window and oriented to blow across the sensor window, the first nozzle positioned below the sensor window and in a first horizontal direction away from the sensor window, the first nozzle being slot-shaped with a first length and a first thickness; and a second nozzle adjacent to the first nozzle and oriented to blow across the sensor window, the second nozzle positioned below the sensor window and in the first horizontal direction away from the sensor window, the second nozzle being slot-shaped with a second length and a second thickness. The second nozzle is farther from the sensor window in the first horizontal direction than the first nozzle, and the first length of the first nozzle is greater than the second length of the second nozzle.

18 Claims, 8 Drawing Sheets

(56) References Cited

U.S. PATENT DOCUMENTS

| | | | |
|---|---|---|---|
| 2022/0097656 A1* | 3/2022 | Sykula | B05B 1/267 |
| 2022/0099802 A1* | 3/2022 | Phinisee | G01S 17/10 |
| 2022/0236380 A1* | 7/2022 | Krishnan | B60R 11/04 |

* cited by examiner

SENSOR APPARATUS WITH CLEANING

BACKGROUND

Vehicles can include a variety of sensors. Some sensors detect internal states of the vehicle, for example, wheel speed, wheel orientation, and engine and transmission values. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. When sensor lenses, covers, and the like become dirty, smudged, etc., sensor operation can be impaired or precluded.

DETAILED DESCRIPTION

Figure 1:
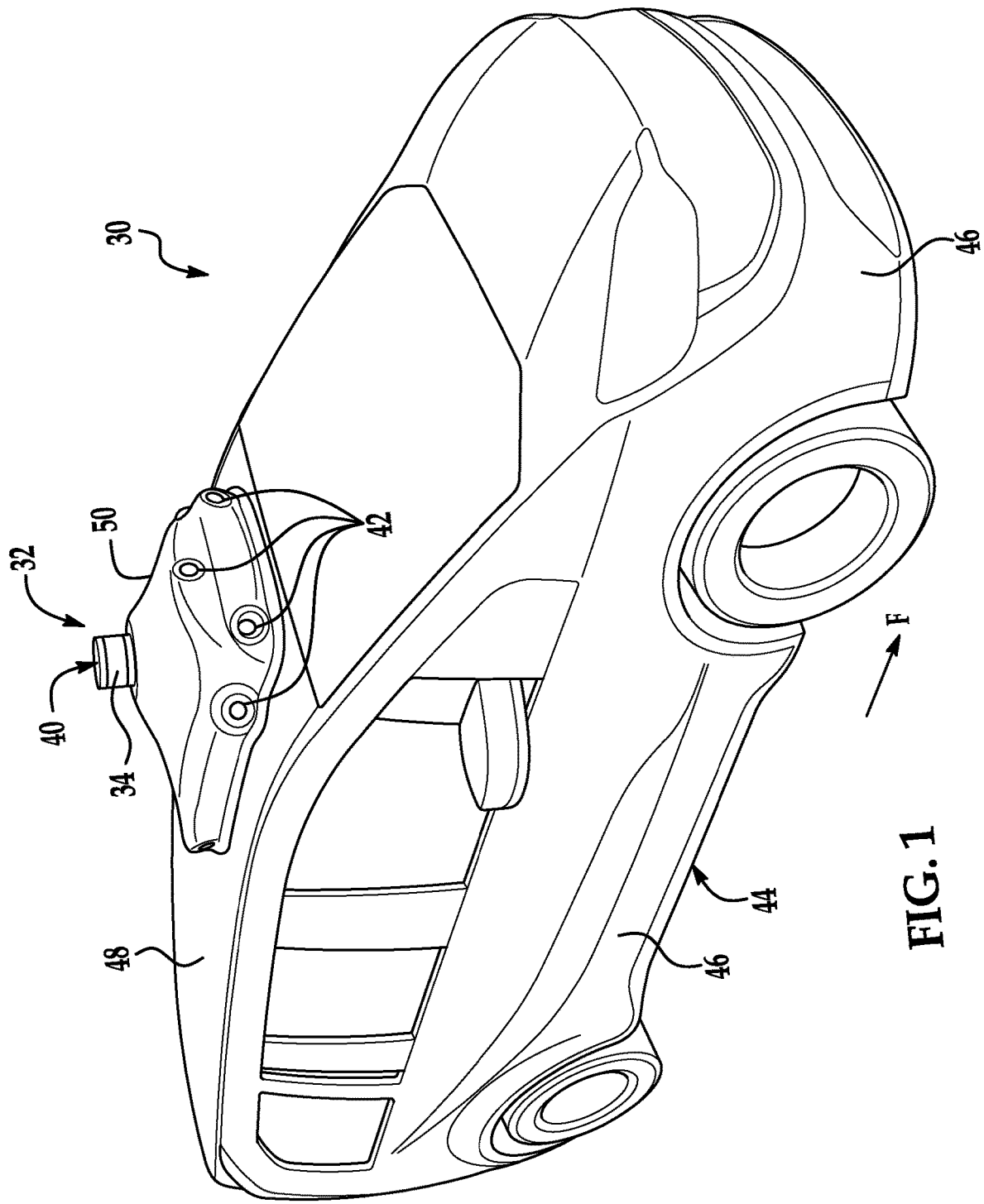
FIG. 1 is a perspective view of an example vehicle with an example sensor apparatus.

A sensor apparatus includes a sensor window, a first nozzle adjacent to the sensor window and oriented to blow across the sensor window, and a second nozzle adjacent to the first nozzle and oriented to blow across the sensor window. The first nozzle is positioned below the sensor window and in a first horizontal direction away from the sensor window, and the first nozzle is slot-shaped with a first length and a first thickness. The second nozzle is positioned below the sensor window and in the first horizontal direction away from the sensor window, and the second nozzle is slot-shaped with a second length and a second thickness. The second nozzle is farther from the sensor window in the first horizontal direction than the first nozzle. The first length of the first nozzle is greater than the second length of the second nozzle.

The first thickness of the first nozzle may be greater than the second thickness of the second nozzle.

The sensor apparatus may further include a baffle separating the first nozzle and the second nozzle. The sensor apparatus may further include a pressurized chamber, and the first nozzle and the second nozzle may be open to the pressurized chamber.

The sensor apparatus may further include a third nozzle adjacent to the second nozzle and oriented to blow across the sensor window, the third nozzle may be positioned below the sensor window and in the first horizontal direction away from the sensor window, and the third nozzle being slot-shaped with a third length and a third thickness. The third nozzle may be farther from the sensor window in the first horizontal direction than the second nozzle, and the second length of the second nozzle may be greater than the third length of the third nozzle. The first thickness of the first nozzle may be greater than the second thickness of the second nozzle, and the second thickness of the second nozzle may be greater than the third thickness of the third nozzle.

The sensor apparatus may further include a first baffle separating the first nozzle and the second nozzle, and a second baffle separating the second nozzle and the third nozzle. The sensor apparatus may further include a pressurized chamber, and the first nozzle, the second nozzle, and the third nozzle may be open to the pressurized chamber.

A width of the sensor window projected in the first horizontal direction is greater than the first length of the first nozzle projected in the first horizontal direction.

The sensor window may be cylindrical and may define an axis extending vertically. The first nozzle may follow an arc of circle centered on the axis, and the second nozzle may follow an arc of circle centered on the axis. The first nozzle may extend less than 90° around the axis.

The sensor apparatus may further include a fourth nozzle oriented to blow across the sensor window, the fourth nozzle may be slot-shaped, the first nozzle may be elongated from a first end to a second end, and the fourth nozzle may be elongated from the first end of the first nozzle away from the first nozzle circumferentially around the axis to the second end of the first nozzle. The sensor apparatus may further include a third baffle forming the first end of the first nozzle and separating the first nozzle and the fourth nozzle, and a fourth baffle forming the second end of the first nozzle and separating the first nozzle and the fourth nozzle. The sensor apparatus may further include a pressurized chamber, and the first nozzle, the second nozzle, and the fourth nozzle may be open to the pressurized chamber.

A sensor system includes a sensor window, a first nozzle adjacent to the sensor window and oriented to blow across the sensor window, a second nozzle adjacent to the first nozzle and oriented to blow across the sensor window, a pressurized-air source positioned to supply the first nozzle and the second nozzle, and a computer communicatively coupled to the pressurized-air source. The first nozzle is positioned below the sensor window and in a first horizontal direction away from the sensor window, and the first nozzle is slot-shaped with a first length and a first thickness. The second nozzle is positioned below the sensor window and in the first horizontal direction away from the sensor window, and the second nozzle is slot-shaped with a second length and a second thickness. The second nozzle is farther from the sensor window in the first horizontal direction than the first nozzle. The first length of the first nozzle is greater than the second length of the second nozzle. The computer is programmed to change a pressure of the pressurized-air source based on a speed of a vehicle including the sensor window.

The computer may be programmed to set the pressure of the pressurized-air source to a first pressure when the speed of the vehicle is below a speed threshold, and to set the pressure of the pressurized-air source to a second pressure when the speed of the vehicle is above the speed threshold, and the second pressure may be greater than the first pressure.

With reference to the Figures, a sensor apparatus 32 of a vehicle 30 includes a sensor window 34; a first nozzle 36 adjacent to the sensor window 34 and oriented to blow across the sensor window 34, the first nozzle 36 positioned below the sensor window 34 and in a first horizontal direction F away from the sensor window 34, the first nozzle 36 being slot-shaped with a first length $L_1$ and a first thickness $T_1$; and a second nozzle 38 adjacent to the first nozzle 36 and oriented to blow across the sensor window 34, the second nozzle 38 positioned below the sensor window 34 and in the first horizontal direction F away from the sensor window 34, the second nozzle 38 being slot-shaped with a second length $L_2$ and a second thickness $T_2$. The second nozzle 38 is farther from the sensor window 34 in the first horizontal direction F than the first nozzle 36, and the first length $L_1$ of the first nozzle 36 is greater than the second length $L_2$ of the second nozzle 38.

The sensor apparatus 32 provides a resource-efficient way to prevent or eliminate a stagnation zone that can develop in front of the sensor window 34. A stagnation zone is a volume of air in front of the sensor window 34 that is generally not moving relative to the sensor window 34 as the vehicle 30 moves forward. The relative positions and sizes of the first nozzle 36 and the second nozzle 38 serve to blow a stagnation zone off of the sensor window 34. The first nozzle 36 has a larger area than the second nozzle 38 does and so has a greater energy output than the second nozzle 38 does. Greater energy is needed to remove the stagnation zone when it is closer to the sensor window 34. The sizing and position of the first nozzle 36 and second nozzle 38 can remove a stagnation zone with a small amount of airflow, making efficient use of the energy required to produce the airflow. Once a stagnation zone is removed from in front of the sensor window 34, the first nozzle 36 and second nozzle 38 can provide an air curtain that can prevent debris, dust, precipitation, etc. from contacting the sensor window 34.

With reference to FIG. 1, the vehicle 30 may be any passenger or commercial automobile such as a car, a truck, a sport utility vehicle, a crossover, a van, a minivan, a taxi, a bus, etc.

The vehicle 30 may be an autonomous vehicle. A vehicle computer can be programmed to operate the vehicle 30 independently of the intervention of a human driver, completely or to a lesser degree. The vehicle computer may be programmed to operate a propulsion, brake system, steering, and/or other vehicle systems based at least in part on data received from a LIDAR sensor 40 described below, as well as other sensors 42. For the purposes of this disclosure, autonomous operation means the vehicle computer controls the propulsion, brake system, and steering without input from a human driver; semi-autonomous operation means the vehicle computer controls one or two of the propulsion, brake system, and steering and a human driver controls the remainder; and nonautonomous operation means a human driver controls the propulsion, brake system, and steering.

The vehicle 30 includes a body 44. The vehicle 30 may be of a unibody construction, in which a frame and the body 44 of the vehicle 30 are a single component. The vehicle 30 may, alternatively, be of a body-on-frame construction, in which the frame supports the body 44 that is a separate component from the frame. The frame and body 44 may be formed of any suitable material, for example, steel, aluminum, etc.

The body 44 includes body panels 46 partially defining an exterior of the vehicle 30. The body panels 46 may present a class-A surface, e.g., a finished surface exposed to view by a customer and free of unaesthetic blemishes and defects. The body panels 46 include, e.g., a roof 48, etc.

A housing 50 for the LIDAR sensor 40 and the other sensors 42 is attachable to one of the body panels 46 of the vehicle 30, e.g., the roof 48. For example, the housing 50 may be shaped to be attachable to the roof 48, e.g., may have a shape matching a contour of the roof 48. The housing 50 may be attached to the roof 48, which can provide the LIDAR sensor 40 and the other sensors 42 with an unobstructed field of view of an area around the vehicle 30. The housing 50 may be formed of, e.g., plastic or metal.

Figure 2:
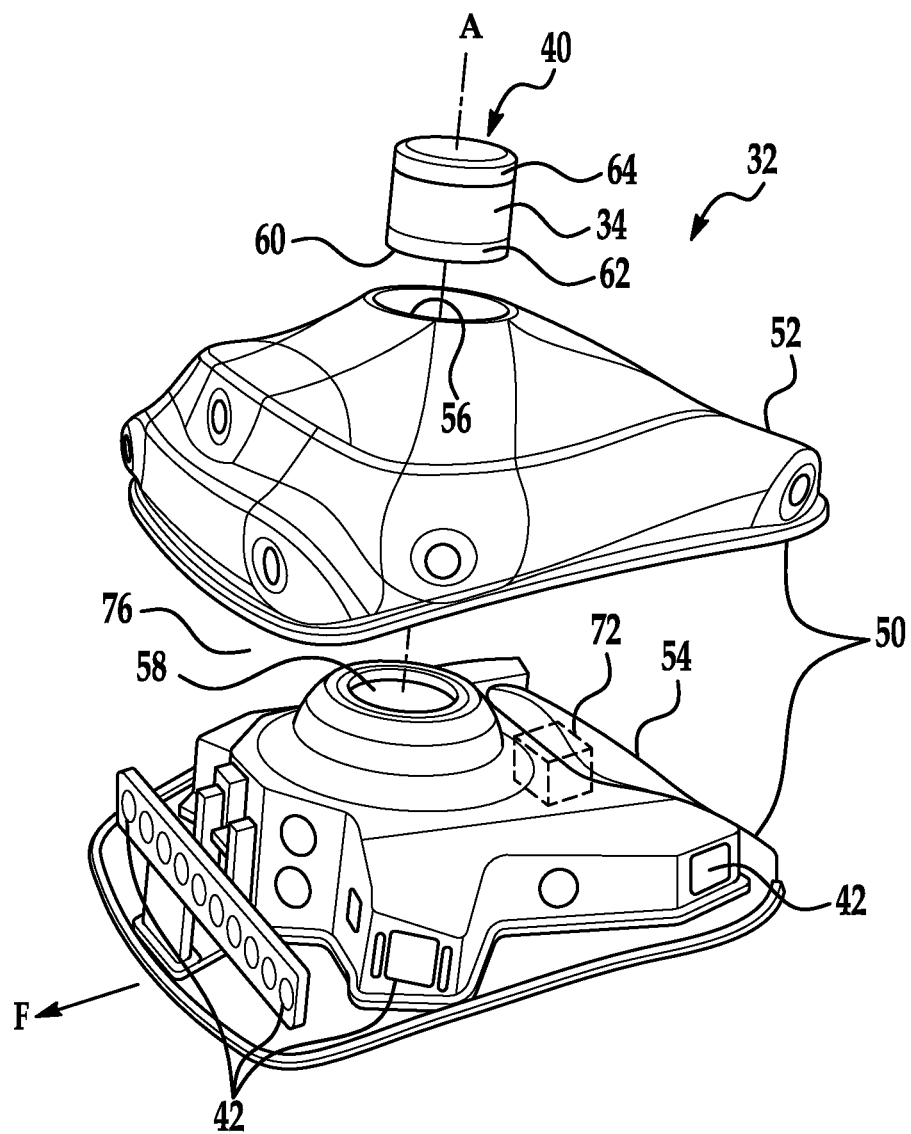
FIG. 2 is an exploded perspective view of the sensor apparatus.

With reference to FIG. 2, the housing 50 includes an upper housing portion 52 and a lower housing portion 54. The upper housing portion 52 and the lower housing portion 54 are shaped to fit together, with the upper housing portion 52 fitting on top of the lower housing portion 54. The upper housing portion 52 covers the lower housing portion 54. The upper housing portion 52 includes a central opening 56 that exposes the lower housing portion 54. The central opening 56 is round, e.g., has a circular or slightly elliptical shape. The upper housing portion 52 and the lower housing portion 54 are each a single piece, i.e., are a continuous piece of material with no internal seams separating multiple pieces. For example, the upper housing portion 52 and the lower housing portion 54 may each be stamped or molded as a single piece.

Figure 3:
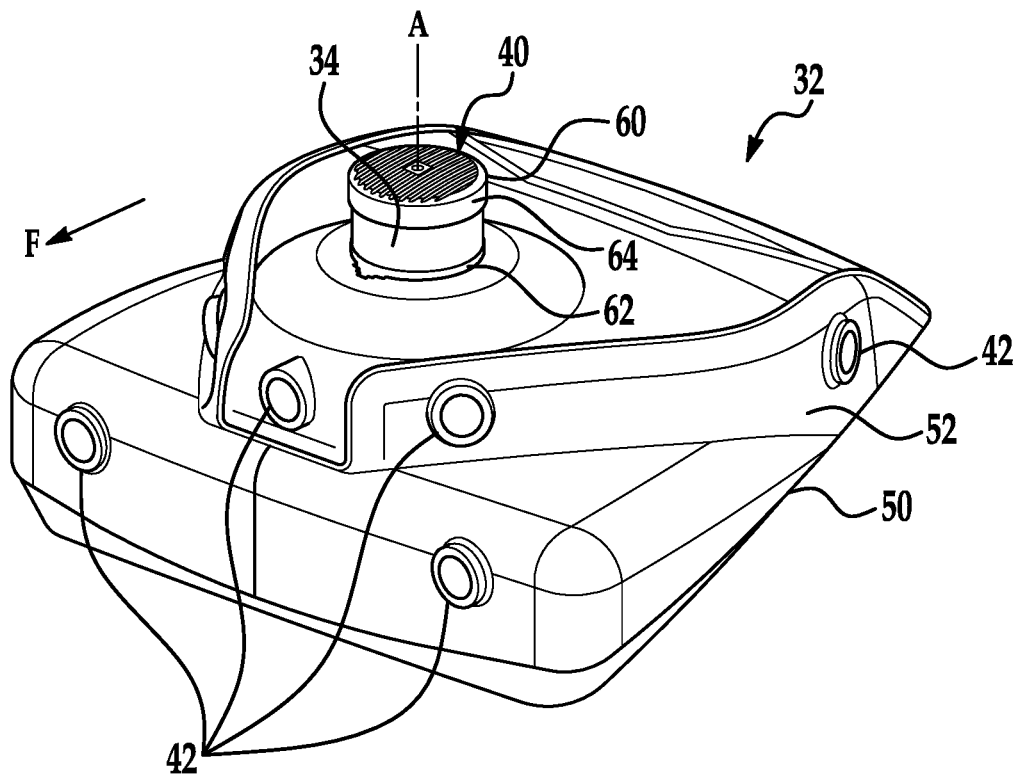
FIG. 3 is a perspective view of the sensor apparatus.

With reference to FIGS. 2 and 3, the lower housing portion 54 includes a bracket 58 to which the LIDAR sensor 40 is mounted. The LIDAR sensor 40 is supported by and mounted to the housing 50, specifically typically to the lower housing portion 54. The LIDAR sensor 40 can be disposed on top of the housing 50 at a highest point of the housing 50. The bracket 58 is shaped to accept and fix in place the LIDAR sensor 40, e.g., with a press fit or snap fit. The bracket 58 defines an orientation and position of the LIDAR sensor 40 relative to the body 44 of the vehicle 30. The position of the LIDAR sensor 40 affords the LIDAR sensor 40 a 360° horizontal field of view of the environment surrounding the vehicle 30, as shown in FIG. 3. The LIDAR sensor 40 detects distances to objects by emitting laser pulses at a particular wavelength and measuring the time of flight for the pulse to travel to the object and back.

With reference to FIG. 3, the LIDAR sensor 40 includes a sensor housing 60. The sensor housing 60 has a cylindrical shape and defines an axis A. The sensor housing 60 extends vertically upward along the axis A from a sensor-housing bottom 62. The sensor housing 60 includes a sensor-housing top 64, the sensor window 34, and the sensor-housing bottom 62. The sensor-housing top 64 is disposed directly above the sensor window 34, and the sensor-housing bottom 62 is disposed directly below the sensor window 34. The sensor-housing top 64 and the sensor-housing bottom 62 are vertically spaced apart by a height of the sensor window 34.

The sensor window 34 is cylindrical and defines the axis A, which is oriented substantially vertically. The sensor window 34 extends around the axis A. The sensor window 34 can extend fully around the axis A, i.e., 360°, or partially around the axis A. The sensor window 34 extends along the axis A from a bottom edge 66 to a top edge 68. The bottom edge 66 contacts the sensor-housing bottom 62, and the top edge 68 contacts the sensor-housing top 64. The outer diameter of the sensor window 34 may be the same as the outer diameters of the sensor-housing top 64 and/or the sensor-housing bottom 62; in other words, the sensor window 34 may be flush or substantially flush with the sensor-housing top 64 and/or the sensor-housing bottom 62. "Substantially flush" means a seam between the sensor window 34 and the sensor-housing top 64 or sensor-housing bottom 62 does not cause turbulence in air flowing along the sensor window 34. At least some of the sensor window 34 is transparent with respect to the medium that the LIDAR sensor 40 is capable of detecting, e.g., visible light at the wavelengths generated by the LIDAR sensor 40.

Figure 4:
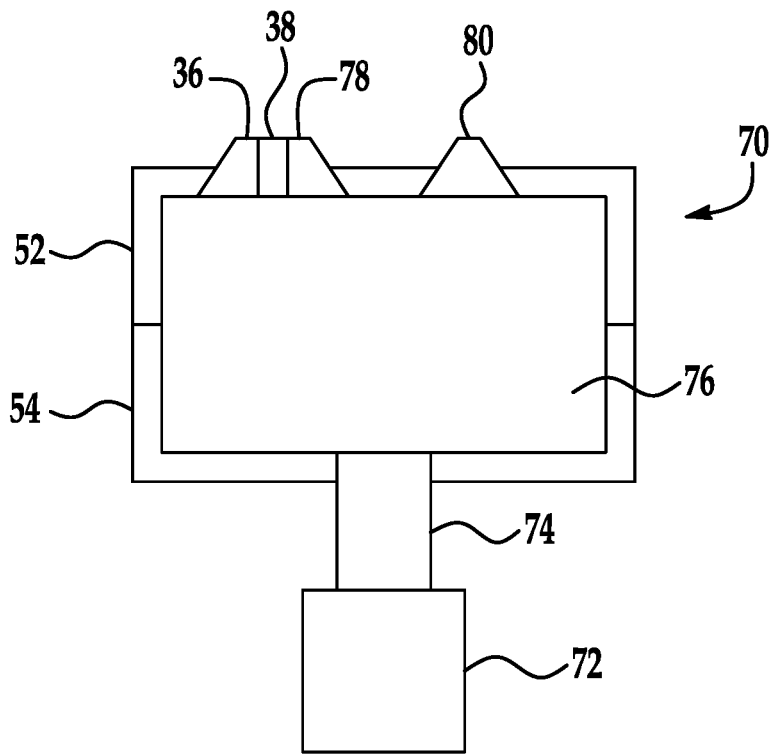
FIG. 4 is a diagram of an example air cleaning system of the sensor apparatus.

With reference to FIG. 4, an air cleaning system 70 includes a pressurized-air source 72, a filter 74, a pressurized chamber 76, the first nozzle 36, the second nozzle 38, a third nozzle 78, and a fourth nozzle 80. The pressurized-air source 72, the filter 74, and the nozzles 36, 38, 78, 80 are fluidly connected to each other (i.e., fluid can flow from one to the other) in sequence through the pressurized chamber 76.

The pressurized-air source 72 increases the pressure of a gas by, e.g., forcing additional gas into a constant volume. The pressurized-air source 72 may be any suitable type of blower, e.g., a fan, or suitable type of compressor, e.g., a positive-displacement compressor such as a reciprocating, ionic liquid piston, rotary screw, rotary vane, rolling piston, scroll, or diaphragm compressor; a dynamic compressor such as an air bubble, centrifugal, diagonal, mixed-flow, or axial-flow compressor; or any other suitable type. The pressurized-air source 72 is positioned to supply the nozzles 36, 38, 78, 80 via the pressurized chamber 76. The pressurized-air source 72 is adjustable and can increase or decrease the pressure of the pressurized chamber 76. A single pressurized-air source 72 can supply the nozzles 36, 38, 78, 80 with airflow because of the relative sizing and positions of the nozzles 36, 38, 78, 80.

The filter 74 removes solid particulates such as dust, pollen, mold, dust, and bacteria from air flowing through the filter 74. The filter 74 may be any suitable type of filter, e.g., paper, foam, cotton, stainless steel, oil bath, etc.

The housing 50 includes the pressurized chamber 76; in particular, the upper housing portion 52 and the lower housing portion 54 form the pressurized chamber 76 by enclosing a space between the upper housing portion 52 and the lower housing portion 54. The pressurized-air source 72 can be positioned to pressurize the pressurized chamber 76, i.e., positioned to draw in air from outside the housing 50 and output air into the pressurized chamber 76.

The nozzles 36, 38, 78, 80 are open to the pressurized chamber 76. Air in the pressurized chamber 76 is forced out through the nozzles 36, 38, 78, 80 because the chamber is at greater than atmospheric pressure. As the pressure in the pressurized chamber 76 is increased, a greater volume of air passes through the nozzles 36, 38, 78, 80 at a higher speed.

With reference to FIGS. 5-8, each of the nozzles 36, 38, 78, 80 is oriented to blow across the sensor window 34. The nozzles 36, 38, 78, 80 are oriented to blow in an upward direction. The nozzles 36, 38, 78, 80 are oriented to blow generally parallel to each other.

The first nozzle 36 is positioned adjacent to the sensor window 34. The first nozzle 36 is positioned below the sensor window 34 and in the first horizontal direction F away from the sensor window 34, specifically in the first horizontal direction F from the axis A. The first horizontal direction F can be a vehicle-forward direction, i.e., the direction from the sensor window 34 at which a stagnation zone would form. The first nozzle 36 is positioned between the sensor window 34 and the second nozzle 38 along the first horizontal direction F. The first nozzle 36 is centered on the first horizontal direction F as extended from the axis A.

The first nozzle 36 is slot-shaped, i.e., having a gap with a generally constant thickness following a path significantly longer than the thickness, with the first length $L_1$ and the first thickness $T_1$. The first length $L_1$ and the first thickness $T_1$ are dimensions defined with respect to the slot shape of the first nozzle 36; in particular, the first length $L_1$ is a path length of a longest path along which the slot shape follows, and the first thickness $T_1$ is a dimension perpendicular to the path that the slot shape follows. The first nozzle 36 is elongated from a first end 82 to a second end 84 along the path. The first nozzle 36 is elongated to follow an arc of circle centered on the axis. The first length $L_1$ is thus $(\theta/360)*\pi*D$, in which $\theta$ is the angle of the circle covered by the first nozzle 36 and D is a diameter of the circle. The first nozzle 36 extends less than 90° around the axis, i.e., $\theta<90°$. The first thickness $T_1$ is constant from the first end 82 of the first nozzle 36 to the second end 84 of the first nozzle 36. The first thickness $T_1$ is a distance in a radial direction from a radially inside surface of the first nozzle 36 to a radially outside surface of the first nozzle 36.

The second nozzle 38 is positioned adjacent to the first nozzle 36. The second nozzle 38 is positioned below the sensor window 34 and in the first horizontal direction F away from the sensor window 34 and from the first nozzle 36, specifically in the first horizontal direction F from the axis A. The second nozzle 38 is positioned between the first nozzle 36 and the third nozzle 78 along the first horizontal direction F. The second nozzle 38 is centered on the first horizontal direction F as extended from the axis A.

The second nozzle 38 is slot-shaped with the second length $L_2$ and the second thickness $T_2$. The second length $L_2$ and the second thickness $T_2$ are dimensions defined with respect to the slot shape of the second nozzle 38; in particular, the second length $L_2$ is a path length of a longest path along which the slot shape follows, and the second thickness $T_2$ is a dimension perpendicular to the path that the slot shape follows. The second nozzle 38 is elongated from a first end 86 to a second end 88 along the path. The second nozzle 38 is elongated to follow an arc of circle centered on the axis. The second length $L_2$ is thus $(\theta/360)*\pi*D$, in which $\theta$ is the angle of the circle covered by the second nozzle 38 and D is a diameter of the circle. The second nozzle 38 extends less than 90° around the axis, i.e., $\theta<90°$. The second thickness $T_2$ is constant from the first end 86 of the second nozzle 38 to the second end 88 of the second nozzle 38. The second thickness $T_2$ is a distance in a radial direction from a radially inside surface of the second nozzle 38 to a radially outside surface of the second nozzle 38.

The third nozzle 78 is positioned adjacent to the second nozzle 38. The third nozzle 78 is positioned below the sensor window 34 and in the first horizontal direction F away from the sensor window 34 and from the second nozzle 38, specifically in the first horizontal direction F from the axis A. The third nozzle 78 is centered on the first horizontal direction F as extended from the axis A.

The third nozzle 78 is slot-shaped with a third length $L_3$ and a third thickness $T_3$. The third length $L_3$ and the third thickness $T_3$ are dimensions defined with respect to the slot shape of the third nozzle 78; in particular, the third length $L_3$ is a path length of a longest path along which the slot shape follows, and the third thickness $T_3$ is a dimension perpendicular to the path that the slot shape follows. The third nozzle 78 is elongated from a first end 90 to a second end 92 along the path. The third nozzle 78 is elongated to follow an arc of circle centered on the axis. The third length $L_3$ is thus ($\theta$/360)*$\pi$*D, in which $\theta$ is the angle of the circle covered by the third nozzle 78 and D is a diameter of the circle. The third nozzle 78 extends less than 90° around the axis, i.e., $\theta$<90°. The third thickness $T_3$ is constant from the first end 90 of the third nozzle 78 to the second end 92 of the third nozzle 78. The third thickness $T_3$ is a distance in a radial direction from a radially inside surface of the third nozzle 78 to a radially outside surface of the third nozzle 78.

The first length $L_1$ of the first nozzle 36 is greater than the second length $L_2$ of the second nozzle 38, and the second length $L_2$ of the second nozzle 38 is greater than the third length $L_3$ of the third nozzle 78. The first thickness $T_1$ of the first nozzle 36 is greater than the second thickness $T_2$ of the second nozzle 38, and the second thickness $T_2$ of the second nozzle 38 is greater than the third thickness $T_3$ of the third nozzle 78. Thus, the energy outputted by the first nozzle 36, second nozzle 38, and third nozzle 78 is greater closer to the sensor window 34, which helps remove any stagnation zones from in front of the sensor window 34. A projected width W' of the sensor window 34 projected in the first horizontal direction F is greater than a projected length L' of the first length $L_1$ of the first nozzle 36 projected in the first horizontal direction F; in other words, the first nozzle 36 is narrower than the sensor window 34 as viewed from directly in front of the sensor apparatus 32. Thus, the first nozzle 36, second nozzle 38, and third nozzle 78 are laterally positioned to focus only on the area at which a stagnation zone is likely to form for the cylindrical sensor window 34.

Figure 5:
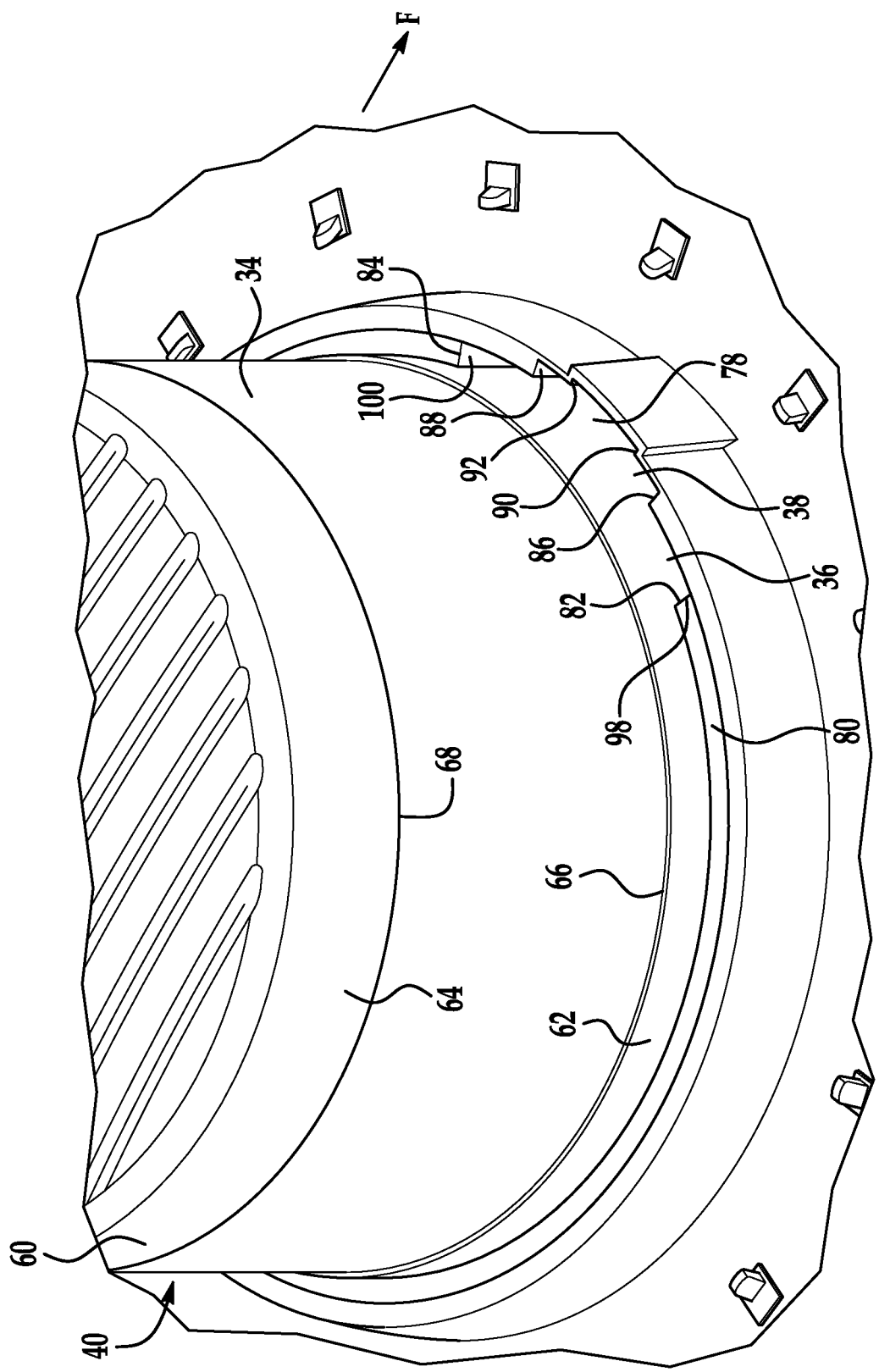
FIG. 5 is a perspective view of a portion of the sensor apparatus with nozzles following a first example.
Figure 6:
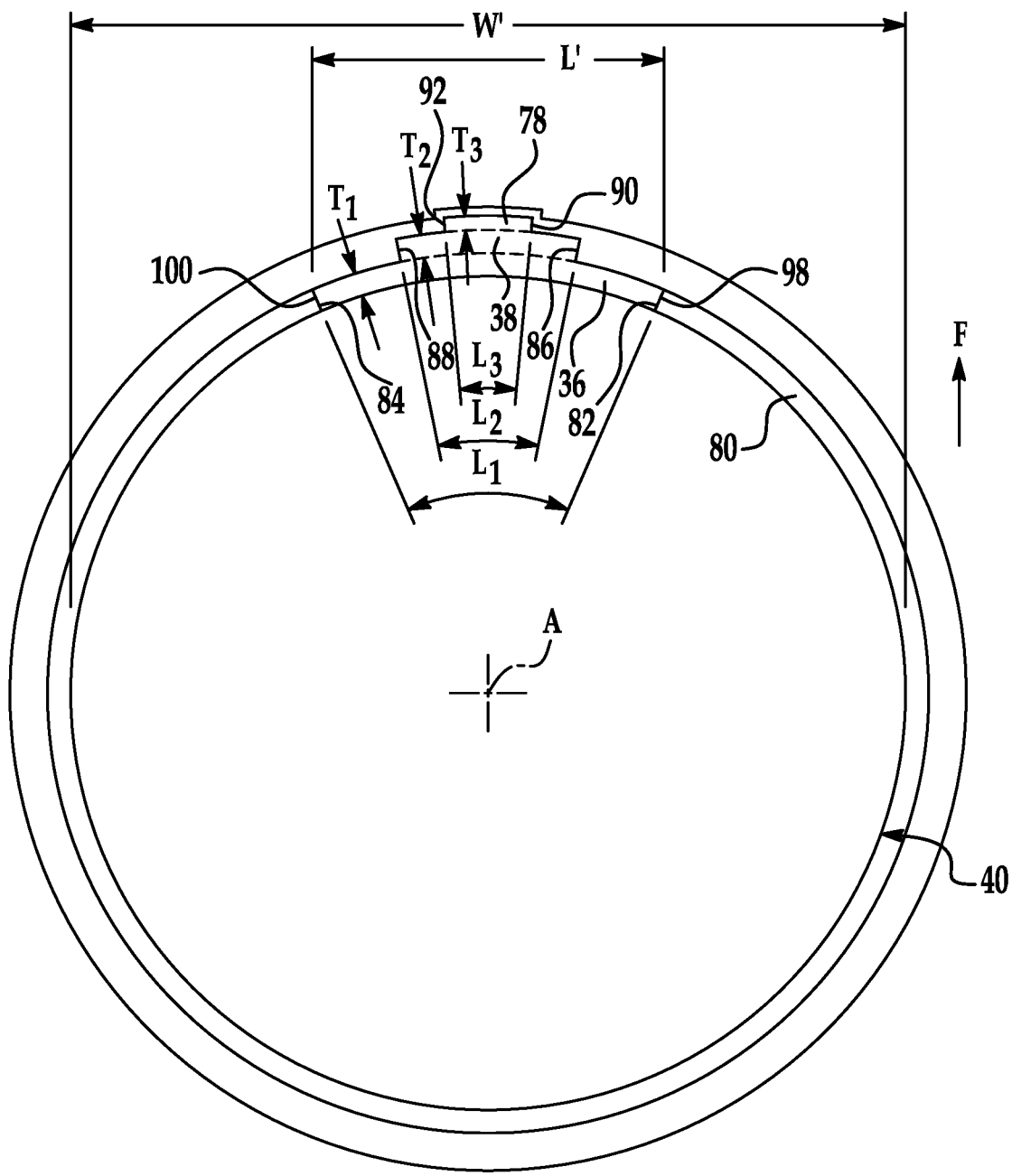
FIG. 6 is a top view of a portion of the sensor apparatus with the nozzles of FIG. 5.

With reference to FIGS. 5 and 6, in one example of the sensor apparatus 32, the first nozzle 36, the second nozzle 38, and the third nozzle 78 are open to each other. In other words, no barrier separates the first nozzle 36 from the second nozzle 38, and no barrier separates the second nozzle 38 from the third nozzle 78.

Figure 7:
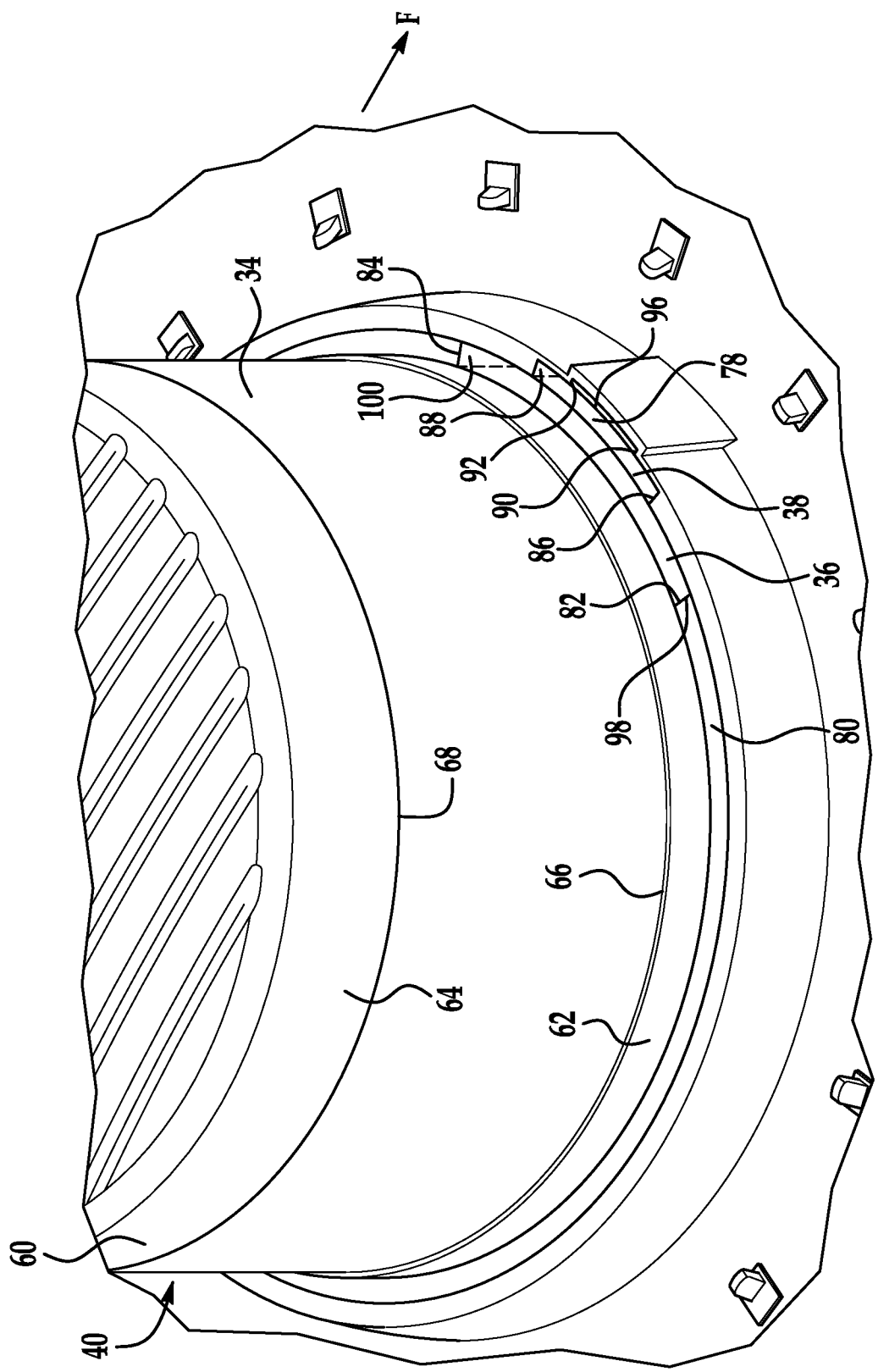
FIG. 7 is a perspective view of a portion of the sensor apparatus with nozzles following a second example.
Figure 8:
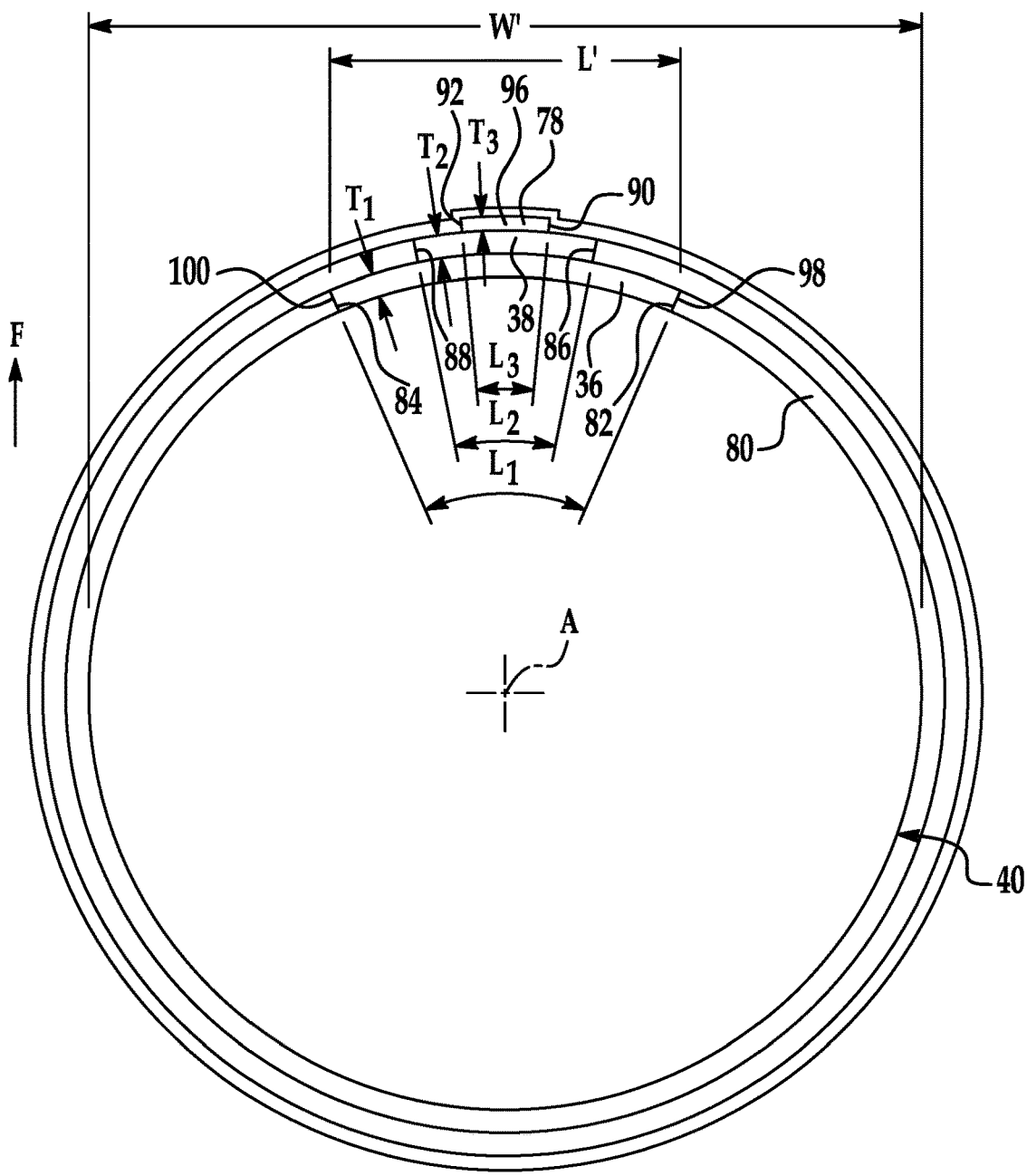
FIG. 8 is a top view of a portion of the sensor apparatus with the nozzles of FIG. 7.

With reference to FIGS. 7 and 8, in another example of the sensor apparatus 32, the sensor apparatus 32 includes a first baffle 94 and a second baffle 96. The first baffle 94 separates the first nozzle 36 and the second nozzle 38. The first baffle 94 follows an arc of circle from the first end 86 of the second nozzle 38 to the second end 88 of the second nozzle 38. The second baffle 96 separates the second nozzle 38 and the third nozzle 78. The second baffle 96 follows an arc of circle from the first end 90 of the third nozzle 78 to the second end 88 of the third nozzle 78. The first baffle 94 and second baffle 96 can serve to orient the airflow through the first nozzle 36, second nozzle 38, and third nozzle 78.

With reference to FIGS. 5-8, returning to features common to both examples of the sensor apparatus 32 shown in the Figures, the fourth nozzle 80 is positioned adjacent to the sensor window 34. The fourth nozzle 80 is positioned below the sensor window 34 and radially outward from the sensor window 34 relative to the axis A. The fourth nozzle 80 is slot-shaped. The fourth nozzle 80 is elongated along an arc of circle centered on the axis A from the first end 82 of the first nozzle 36 away from the first nozzle 36 circumferentially around the axis A to the second end 84 of the first nozzle 36. The fourth nozzle 80 follows a path along the same circle centered on the axis A as the first nozzle 36 does. The fourth nozzle 80 extends more than 270° around the axis A. The fourth nozzle 80 has a constant thickness circumferentially from the first end 82 of the first nozzle 36 to the second end 84 of the first nozzle 36.

The sensor apparatus 32 includes a third baffle 98 and a fourth baffle 100. (The adjectives "third" and "fourth" are used to distinguish from the first baffle 94 and second baffle 96 even though the first baffle 94 and second baffle 96 may not be present, as in FIGS. 5 and 6.) The third baffle 98 forms the first end 82 of the first nozzle 36, and the fourth baffle 100 forms the second end 84 of the first nozzle 36. The third baffle 98 separates the first nozzle 36 and the fourth nozzle 80 at the first end 82 of the first nozzle 36. The fourth baffle 100 separates the first nozzle 36 and the fourth nozzle 80 at the second end 84 of the first nozzle 36. The third baffle 98 and fourth baffle 100 each extend radially outward relative to the axis A from a radially inside surface of the first nozzle 36 to a radially outside surface of the first nozzle 36.

Figure 9:
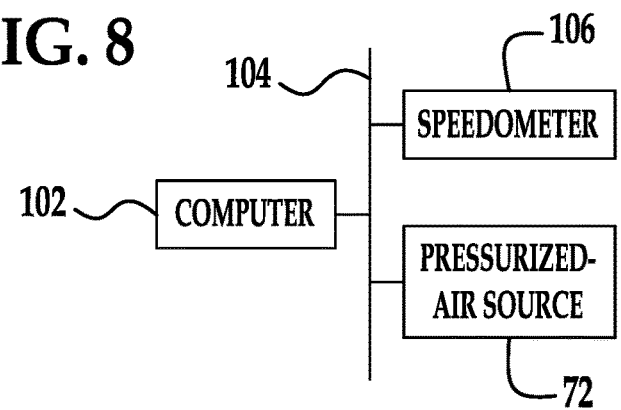
FIG. 9 is a block diagram of an example control system of the sensor apparatus.

With reference to FIG. 9, the vehicle 30 includes a computer 102. The computer 102 is a microprocessor-based computing device, e.g., a generic computing device including a processor and a memory, an electronic controller or the like, a field-programmable gate array (FPGA), an application-specific integrated circuit (ASIC), etc. The computer 102 can include a processor, a memory, etc. The memory of the computer 102 includes media for storing instructions executable by the processor as well as for electronically storing data and/or databases, and/or the computer can include structures such as the foregoing by which programming is provided. The computer 102 can be multiple computers coupled together.

The computer 102 may transmit and receive data through a communications network 104 such as a controller area network (CAN) bus, Ethernet, WiFi, Local Interconnect Network (LIN), onboard diagnostics connector (OBD-II), and/or by any other wired or wireless communications network. The computer 102 may be communicatively coupled to a speedometer 106, the pressurized-air source 72, and other components via the communications network 104.

The vehicle 30 includes the speedometer 106. The speedometer 106 may be any sensor suitable for measuring the speed of the vehicle 30, for example, as is known, a mechanical or eddy-current speedometer, or a vehicle speed sensor. A vehicle speed sensor may use a magnetic field detector to count interruptions of a magnetic field by a toothed metal disk disposed on a driveshaft of the vehicle 30.

Figure 10:
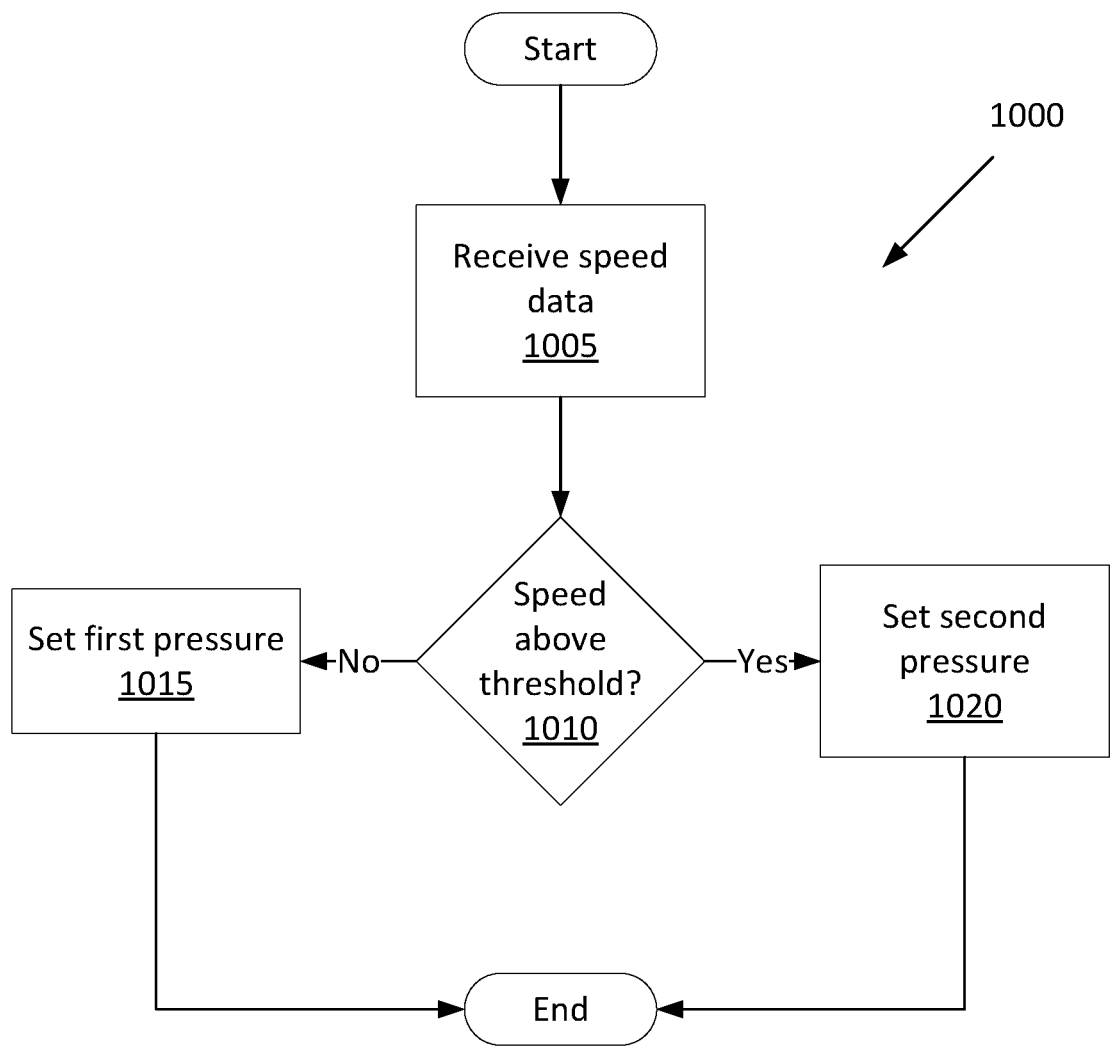
FIG. 10 is a process flow diagram of an example process for controlling the air cleaning system of the sensor apparatus.

FIG. 10 is a process flow diagram illustrating an exemplary process 1000 for controlling the air cleaning system 70 of the sensor apparatus 32. The memory of the computer 102 stores executable instructions for performing the steps of the process 1000 and/or programming can be implemented in structures such as mentioned above. As a general overview of the process 1000, the computer 102 receives speed data from the speedometer 106 and changes a pressure of the pressurized-air source 72 based on a speed of the vehicle 30. Specifically, the computer 102 can set the pressure of the pressurized-air source 72 at a first, comparatively lower pressure in response to the speed of the vehicle 30 being below a threshold, and the computer 102 can set the pressure of the pressurized-air source 72 at a second, comparatively higher pressure in response to the speed of the vehicle 30 being above the threshold. The first pressure and the second pressure can be chosen from a plurality of preset, discrete pressure levels for the pressurized-air source 72. Using the threshold can provide an optimum use of the discrete pressure levels.

The process 1000 begins in a block 1005, in which the computer 102 receives speed data from the speedometer 106 via the communications network 104. The speed data specifies the speed of the vehicle 30, e.g., in miles per hour.

Next, in a decision block 1010, the computer 102 determines whether the speed of the vehicle 30 is above the threshold. The threshold is a value stored in the memory of the computer 102 and is in the same units as the speed of the vehicle 30, e.g., miles per hour. The threshold can be chosen based on experimental wind tunnel testing or computational fluid-dynamics testing to determine the pressure from the pressurized-air source 72 needed to remove any stagnation zone from in front of the sensor window 34. If the speed of the vehicle 30 is below the threshold, the process 1000 proceeds to a block 1015. If the speed of the vehicle 30 is above the threshold, the process 1000 proceeds to a block 1020.

In the block 1015, the computer 102 sets the pressure of the pressurized-air source 72 to the first pressure. The first pressure is chosen to be sufficient to remove a stagnation zone from in front of the sensor window 34 at speeds up to the threshold. After the block 1015, the process 1000 ends.

In the block 1020, the computer 102 sets the pressure of the pressurized-air source 72 to the second pressure. The second pressure is greater than the first pressure. The second pressure is chosen to be sufficient to remove a stagnation zone from in front of the sensor window 34 at speeds from the threshold up to a preset speed, e.g., a maximum operating speed for autonomous operation of the vehicle 30. After the block 1020, the process 1000 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The disclosure has been described in an illustrative manner, and it is to be understood that the terminology which has been used is intended to be in the nature of words of description rather than of limitation. The adjectives "first," "second," "third," and "fourth" are used throughout this document as identifiers and are not intended to signify importance, order, or quantity. Many modifications and variations of the present disclosure are possible in light of the above teachings, and the disclosure may be practiced otherwise than as specifically described.

What is claimed is:

1. A sensor apparatus comprising:
   a sensor window;
   a first nozzle adjacent to the sensor window and oriented to blow across the sensor window, the first nozzle positioned below the sensor window and in a first horizontal direction away from the sensor window, the first nozzle being slot-shaped with a first length and a first thickness; and
   a second nozzle adjacent to the first nozzle and oriented to blow across the sensor window, the second nozzle positioned below the sensor window and in the first horizontal direction away from the sensor window, the second nozzle being slot-shaped with a second length and a second thickness;
   wherein the second nozzle is farther from the sensor window in the first horizontal direction than the first nozzle; and
   the first length of the first nozzle is greater than the second length of the second nozzle.

2. The sensor apparatus of claim 1, wherein the first thickness of the first nozzle is greater than the second thickness of the second nozzle.

3. The sensor apparatus of claim 1, further comprising a baffle separating the first nozzle and the second nozzle.

4. The sensor apparatus of claim 3, further comprising a pressurized chamber, wherein the first nozzle and the second nozzle are open to the pressurized chamber.

5. The sensor apparatus of claim 1, further comprising a third nozzle adjacent to the second nozzle and oriented to blow across the sensor window, the third nozzle positioned below the sensor window and in the first horizontal direction away from the sensor window, the third nozzle being slot-shaped with a third length and a third thickness.

6. The sensor apparatus of claim 5, wherein the third nozzle is farther from the sensor window in the first horizontal direction than the second nozzle, and the second length of the second nozzle is greater than the third length of the third nozzle.

7. The sensor apparatus of claim 6, wherein the first thickness of the first nozzle is greater than the second thickness of the second nozzle, and the second thickness of the second nozzle is greater than the third thickness of the third nozzle.

8. The sensor apparatus of claim 5, further comprising a first baffle separating the first nozzle and the second nozzle, and a second baffle separating the second nozzle and the third nozzle.

9. The sensor apparatus of claim 8, further comprising a pressurized chamber, wherein the first nozzle, the second nozzle, and the third nozzle are open to the pressurized chamber.

10. The sensor apparatus of claim 1, wherein a width of the sensor window projected in the first horizontal direction is greater than the first length of the first nozzle projected in the first horizontal direction.

11. The sensor apparatus of claim 1, wherein the sensor window is cylindrical and defines an axis extending vertically.

12. The sensor apparatus of claim 11, wherein the first nozzle follows an arc of circle centered on the axis, and the second nozzle follows an arc of circle centered on the axis.

13. The sensor apparatus of claim 12, wherein the first nozzle extends less than 90° around the axis.

14. The sensor apparatus of claim 11, further comprising a fourth nozzle oriented to blow across the sensor window, the fourth nozzle being slot-shaped, wherein the first nozzle is elongated from a first end to a second end, and the fourth nozzle is elongated from the first end of the first nozzle away from the first nozzle circumferentially around the axis to the second end of the first nozzle.

15. The sensor apparatus of claim 14, further comprising a third baffle forming the first end of the first nozzle and separating the first nozzle and the fourth nozzle, and a fourth baffle forming the second end of the first nozzle and separating the first nozzle and the fourth nozzle.

16. The sensor apparatus of claim 15, further comprising a pressurized chamber, wherein the first nozzle, the second nozzle, and the fourth nozzle are open to the pressurized chamber.

17. A sensor system comprising:
    a sensor window;
    a first nozzle adjacent to the sensor window and oriented to blow across the sensor window, the first nozzle positioned below the sensor window and in a first horizontal direction away from the sensor window, the first nozzle being slot-shaped with a first length and a first thickness;
    a second nozzle adjacent to the first nozzle and oriented to blow across the sensor window, the second nozzle positioned below the sensor window and in the first horizontal direction away from the sensor window, the second nozzle being slot-shaped with a second length and a second thickness;
    a pressurized-air source positioned to supply the first nozzle and the second nozzle; and
    a computer communicatively coupled to the pressurized-air source;
    wherein the second nozzle is farther from the sensor window in the first horizontal direction than the first nozzle;
    the first length of the first nozzle is greater than the second length of the second nozzle; and
    the computer is programmed to change a pressure of the pressurized-air source based on a speed of a vehicle including the sensor window.

18. The sensor system of claim 17, wherein the computer is programmed to set the pressure of the pressurized-air source to a first pressure when the speed of the vehicle is below a speed threshold, and to set the pressure of the pressurized-air source to a second pressure when the speed of the vehicle is above the speed threshold, wherein the second pressure is greater than the first pressure.

* * * * *